March 1, 1966     L. J. GROSSWILLER, JR     3,237,853
DEAL DRAWER CONSTRUCTION FOR BANK DRIVE-UP WINDOWS
Filed Oct. 14, 1963     7 Sheets-Sheet 1

INVENTOR.
Leo J. Grosswiller, Jr.
BY
Frease, Bishop, Johns & Schick
ATTORNEYS

March 1, 1966 L. J. GROSSWILLER, JR 3,237,853
DEAL DRAWER CONSTRUCTION FOR BANK DRIVE-UP WINDOWS
Filed Oct. 14, 1963 7 Sheets-Sheet 2

INVENTOR.
Leo J. Grosswiller, Jr.
BY
Frease, Bishop, Johns & Schick
ATTORNEYS March 1, 1966   L. J. GROSSWILLER, JR   3,237,853
DEAL DRAWER CONSTRUCTION FOR BANK DRIVE-UP WINDOWS
Filed Oct. 14, 1963                           7 Sheets-Sheet 3

INVENTOR.
Leo J. Grosswiller, Jr.
BY
Frease, Bishop, Johns & Schick
ATTORNEYS

March 1, 1966　　L. J. GROSSWILLER, JR　　3,237,853
DEAL DRAWER CONSTRUCTION FOR BANK DRIVE-UP WINDOWS
Filed Oct. 14, 1963　　7 Sheets-Sheet 4

INVENTOR.
Leo J. Grosswiller, Jr.
BY
Frease, Bishop, Johns & Schick
ATTORNEYS

March 1, 1966  L. J. GROSSWILLER, JR  3,237,853
DEAL DRAWER CONSTRUCTION FOR BANK DRIVE-UP WINDOWS
Filed Oct. 14, 1963  7 Sheets-Sheet 5

INVENTOR.
Leo J. Grosswiller, Jr.
BY
Frease, Bishop, Johns & Schick
ATTORNEYS

March 1, 1966     L. J. GROSSWILLER, JR     3,237,853
DEAL DRAWER CONSTRUCTION FOR BANK DRIVE-UP WINDOWS
Filed Oct. 14, 1963     7 Sheets-Sheet 6

INVENTOR.
*Leo J. Grosswiller, Jr.*
BY
*Frease, Bishop, Johns & Schick*
ATTORNEYS March 1, 1966     L. J. GROSSWILLER, JR     3,237,853
DEAL DRAWER CONSTRUCTION FOR BANK DRIVE-UP WINDOWS
Filed Oct. 14, 1963     7 Sheets-Sheet 7

INVENTOR.
Leo J. Grosswiller, Jr.
BY
Frease, Bishop, Johns & Schick
ATTORNEYS

United States Patent Office 3,237,853
Patented Mar. 1, 1966

3,237,853
DEAL DRAWER CONSTRUCTION FOR BANK
DRIVE-UP WINDOWS
Leo J. Grosswiller, Jr., East Canton, Ohio, assignor to
Diebold, Incorporated, Canton, Ohio, a corporation of
Ohio
Filed Oct. 14, 1963, Ser. No. 315,924
15 Claims. (Cl. 232—43.3)

My invention relates to deal drawers for bank drive-up windows and the like, and more specifically to a deal drawer constructed to provide more convenient customer access to the deal tray or receptacle thereof. Even more specifically, my invention relates to a deal drawer constructed for providing direct front and at least limited top customer access to the deal tray or receptacle thereof.

Many prior forms of deal drawer constructions for bank drive-up windows and the like have been provided in which a movable drawer is mounted in a wall beneath a drive-up window, movable from an inner position in which the deal tray or receptacle thereof is accessible only by a bank teller, and outwardly through the wall for access to a customer at the outer side of the window. Furthermore, the deal drawers of these constructions have usually been provided with a deal tray or receptacle which is open upwardly so that the customer may place the necessary banking materials therein for the carrying out of the various banking transactions, and so that these may be transported inwardly to the teller within such tray or receptacle, as well as back to the customer.

One of the major difficulties encountered with these prior constructions and this in particularly true of drive-up windows where various forms, sizes and shapes of automobiles are involved, is that it is difficult to determine the proper height for the path of movement of the deal drawer which will present the deal tray or receptacle at a convenient height for proper access by the customer seated in an automobile. Since the deal trays or receptacles have usually been merely upwardly open, it is necessary for the customer to have access downwardly into this tray or receptacle and, if the deal drawer is mounted at proper height for convenient access of customers in the smaller compact and foreign automobiles, this height has been inconvenient for customers in the normal or standard size of automobiles.

Various attempts have been made in deal drawer constructions to solve this varying height problem, for instance, one such form has included a deal drawer which is not only movable inwardly and outwardly of the drive-up window, but is also selectively movable by the teller to various vertical heights. In this manner, the teller may control the vertical height of the deal drawer and selectively place it at a height most convenient to the customer.

These prior forms of constructions have provided a convenient solution to the problem with the exception that, in order to provide this dual horizontal and vertical movement of the deal drawer, it has been necessary to provide a somewhat complex and relatively expensive construction. Not only is it necessary to provide the usual controls and mounting for the horizontal movement of the deal drawer, but it is further necessary to add a relatively expensive and complicated control and mounting system for providing the necessary dual vertical movement thereof.

It is, therefore, a general object of the present invention to provide a deal drawer construction for bank drive-up windows and the like in which the deal drawer is mounted only horizontally movable inward and outward of the drive-up window, yet provides convenient access to the deal tray or receptacle thereof by customers seated in automobiles of virtually any present-day size.

It is a primary object of the present invention to provide a deal drawer construction for bank drive-up windows and the like in which the deal drawer receptacle thereof is accessible to the customer both forwardly and at least limited vertically.

It is a further object of the present invention to provide a deal drawer construction for bank drive-up windows and the like in which the deal drawer receptacle thereof has a pivoted front end member which is mounted for pivotal movement between a position closing the front end of the receptacle when the drawer is moving inwardly and outwardly beneath the window, and pivots downwardly to provide front access to the drawer by the customer when the drawer is in its outer extended position at the outer side of the window.

It is still a further object of the present invention to provide a deal drawer construction for bank drive-up windows and the like in which the deal drawer receptacle is provided with a pivotal front end member which automatically pivots downwardly for access to the receptacle by a customer through the forward end thereof, and which may also be provided with a pivotally mounted lid automatically pivotal upwardly upon downward pivoting of the front end member, to also provide at least limited vertical access to the receptacle by the customer.

It is an additional object of the present invention to provide a deal drawer construction for bank drive-up windows and the like in which the deal drawer receptacle thereof may be provided with both a pivotal front end member and a pivotal lid of the foregoing type, and in which the lid is automatically removable from the receptacle upon the drawer moving to its fully inward position, to thereby provide free vertical access to the receptacle by the bank teller.

It is also an object of the present invention to provide a deal drawer construction for bank drive-up windows and the like in which the deal drawer receptacle thereof is provided with a pivotal front end member for providing front customer access to the receptacle, and which front end member may also be operably connected to the deal drawer for automatic disengagement therefrom upon full inward movement of the drawer, thereby also forming the complete closure for the deal drawer wall opening through which the drawer must move.

It is still a further object of the present invention to provide a deal drawer construction for bank drive-up windows and the like which may be constructed electrically power driven, and has unique power drive release means formed thereon for permitting hand operation upon an electrical power interruption.

Finally, it is an object of the present invention to provide a deal drawer construction for bank drive-up windows and the like which satisfies all of the foregoing objects in a relatively simple and efficient, manner yet may be provided at a minimum of construction cost.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

By way of example, an embodiment of the deal drawer construction for bank drive-up windows of the present invention is illustrated in the accompanying drawings forming a part hereof, wherein like numerals indicate similar parts throughout the several views, and in which.

Figure 1:
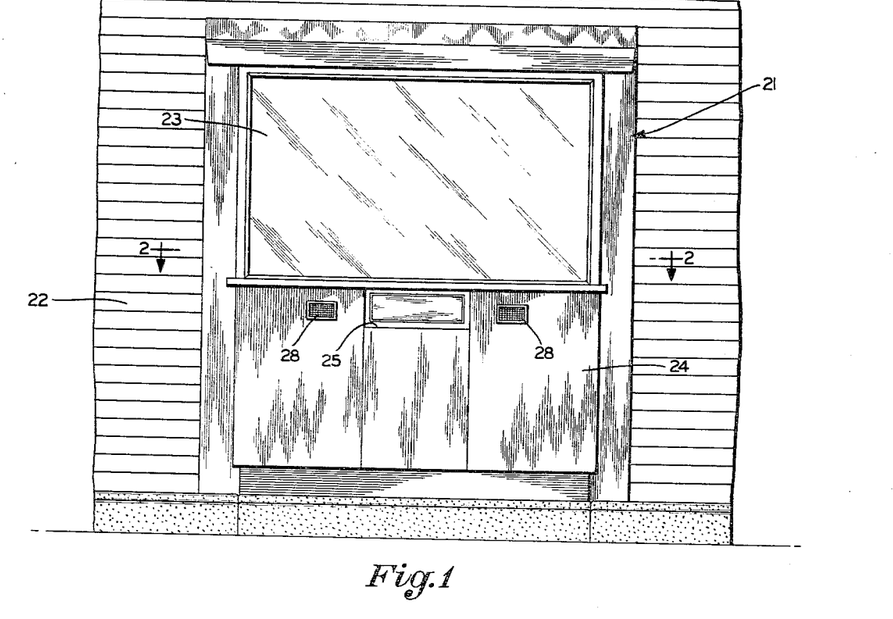
FIG. 1 is a front elevation of a bank drive-up window incorporating the principles of the present invention.
Figure 2:
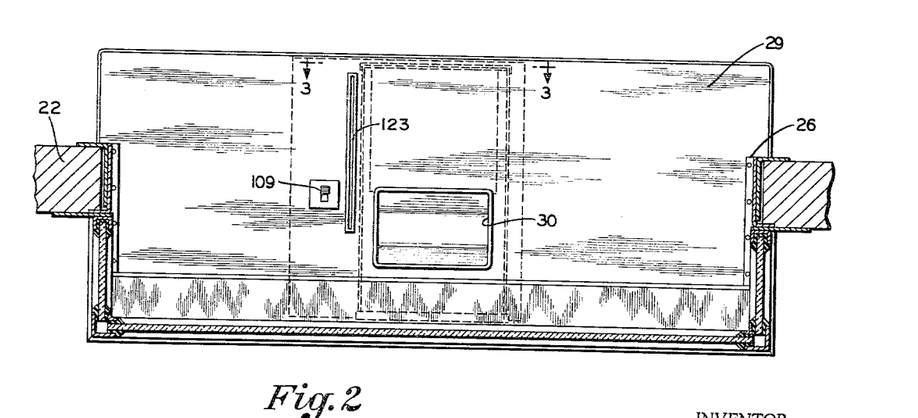
FIG. 2, an enlarged horizontal sectional view, part in elevation, of the bank drive-up window construction of FIG. 1, looking in the direction of the arrows 2—2 in FIG. 1.

As shown in FIGS. 1 and 2, a bank drive-up window 21 is mounted in usual manner in the wall 22 of a bank, and may include the usual window portion 23, and lower metal wall portion 24 having a drawer wall opening 25 extending between the wall inner and outer sides 26 and 27, respectively. The general form of the drive-up window 21 is of the well-known bay window type and further may be provided with the usual communication system 28 for providing verbal communication between a teller positioned at the inner side of the window and a customer positioned at the outer side thereof.

Furthermore, the drive-up window 21 may be provided at the inner side with the usual generally horizontal teller's counter 29 formed with the usual access opening 30 for providing access to a deal drawer when the drawer is positioned fully within the wall portion 24. As hereinbefore stated, the various portions of the drive-up window 21 thus far pointed out may be of usual conventional form and do not form a part of the present invention other than to provide mounting and environment for the deal drawer construction to be hereinafter described.

Referring particularly to FIGS. 3 through 5 and 9 through 12, the deal drawer construction of the present invention includes a three-dimensional box-like stationary frame, generally indicated at 31, which is secured mounted beneath the underside of the teller's counter 29 on a usual horizontal mounting member 32 generally in usual manner. Furthermore, the stationary frame 31 movably mounts a deal drawer, generally indicated at 33, properly aligned with the access opening 30 of the teller's counter 29, and also properly aligned with the wall opening 25 of wall portion 24.

Figure 3:
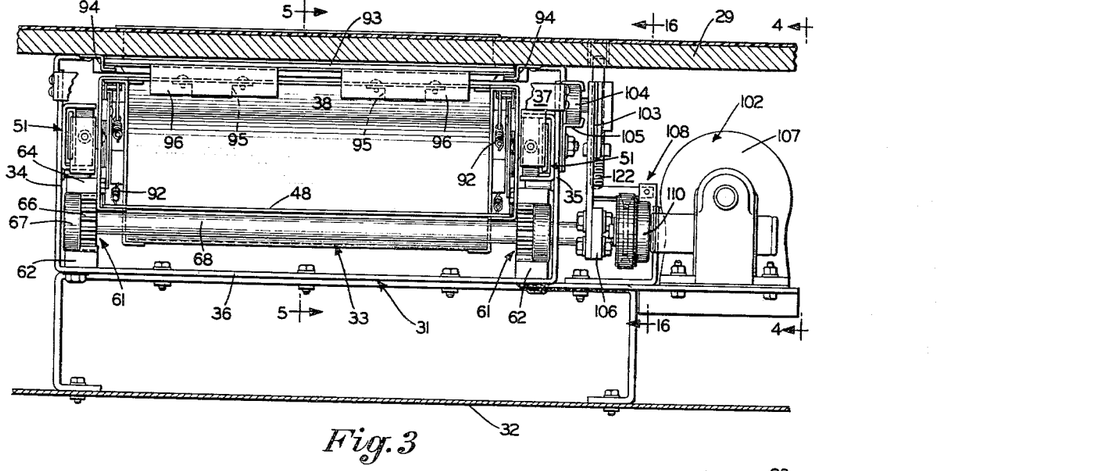
FIG. 3, an enlarged fragmentary vertical sectional view, part in elevation, looking in the direction of the arrows 3—3 in FIG. 2.
Figure 4:
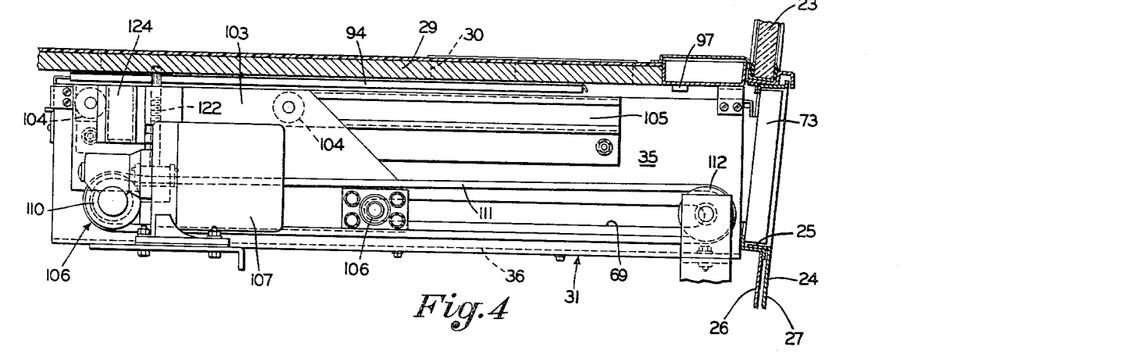
FIG. 4, a fragmentary vertical sectional view, part in elevation, looking in the direction of the arrows 4—4 in FIG. 3.

The stationary frame 31 is provided with the forwardly and rearwardly extending side walls 34 and 35 and the bottom wall 36 with the top being substantially closed by the teller's counter 29. Furthermore, this stationary frame 31 opens forwardly against the wall portion 24 around the wall opening 25 and is open rearwardly with the exception of the rear flange 37 and various mounting brackets to be hereinafter described.

Figure 5:
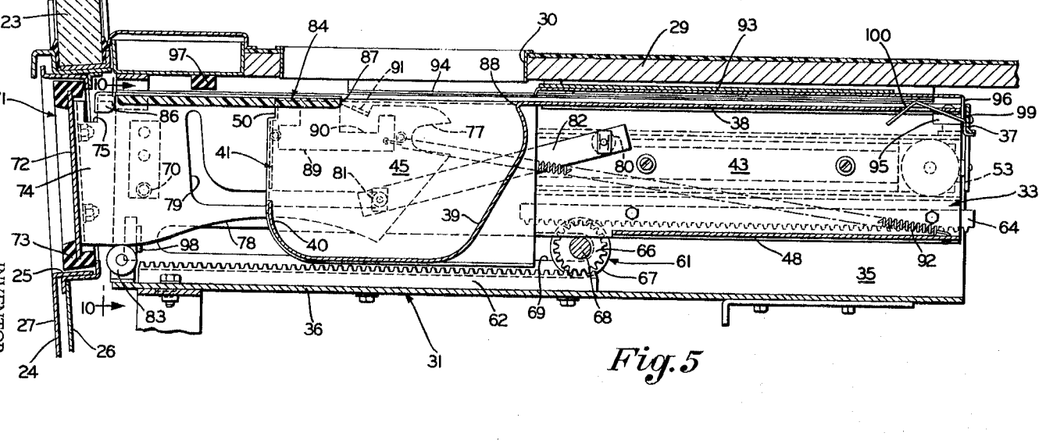
FIG. 5, an enlarged fragmentary sectional view, part in elevation, looking in the direction of the arrows 5—5 in FIG. 3 and showing the deal drawer in fully inward position with the receptacle accessible through the teller's counter.
Figures 9, 10:
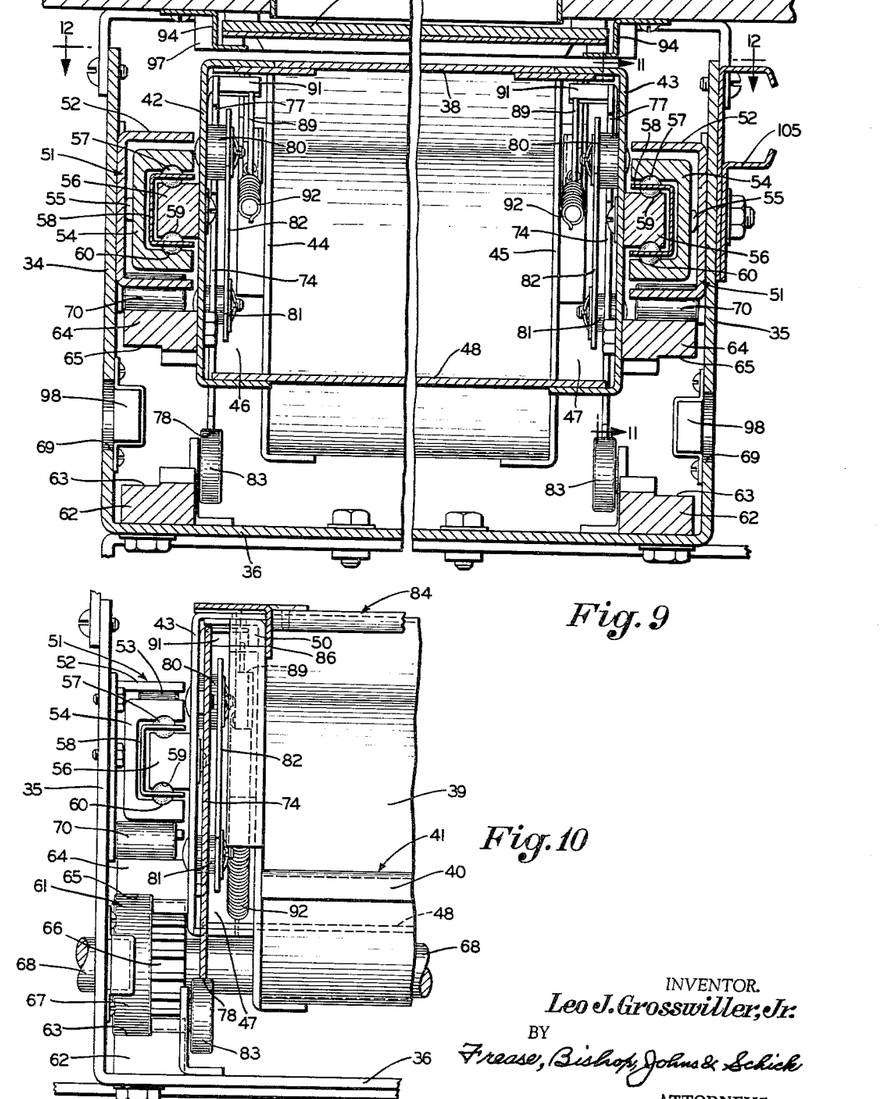
FIG. 9, an enlarged fragmentary sectional view, part in elevation, looking in the direction of the arrows 9—9 in FIG. 6.
FIG. 10, an enlarged fragmentary sectional view, part in elevation, looking in the direction of the arrows 10—10 in FIG. 5.
Figure 11:
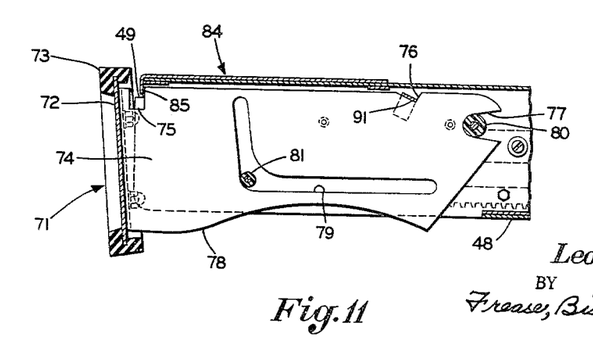
FIG. 11, a reduced fragmentary sectional view, part in elevation, looking in the direction of the arrows 11—11 in FIG. 9.

The deal drawer 33 is likewise generally of three-dimensional box-like configuration and includes the top wall 38 extending forwardly from rearward end thereof and terminating in an upwardly open tray or receptacle 39 extending to the deal drawer forward end. Furthermore, and particularly important to the present invention described herein as will be hereinafter explained in detail, the receptacle 39, as best seen in FIGS. 5 and 10, is formed forwardly in an arcuate upwardly extending flange 40 which extends only a short distance upwardly and terminates in its upper extension spaced a considerable distance downwardly from the upper extremities of receptacle 39. Thus, a front opening 41 is formed on the receptacle 39 occupying the major front part of the receptacle, with the flange 40 only being of sufficient height to form a lower pocket within the receptacle 39 for retaining the usual materials and money involved in the banking transactions and transported in deal drawer constructions of this type.

The deal drawer 33 is further formed with the side walls 42 and 43 which extend from front to rear of the deal drawer, and also from the top wall 38 and the upper extremities of the receptacle 39 downwardly to a level spaced slightly above the lower extremities of the receptacle. At the forward location of the receptacle 39, this receptacle is closed at the sides by the receptacle side walls 44 and 45, which receptacle side walls are spaced inwardly from the main deal drawer side walls 42 and 43 to thereby form the forwardly and rearwardly extending openings 46 and 47. Openings 46 and 47 are also open at the bottom but may be partially closed at the top by appropriate flanging of the main side walls 42 and 43 as well as the receptacle side walls 44 and 45.

A bottom wall 48 is formed on the deal drawer 33 at a level spaced above the lower extremities of the receptacle 39, which bottom wall extends from the lower rearward ends of the deal drawer main side walls 42 and 43 forwardly to the rearward extremities of the receptacle side walls 44 and 45. Finally, each of the main side walls 42 and 43 are formed at the front upper corners thereof with a notch 49, best seen in FIG. 11, and each of the receptacle side walls 44 and 45 at the front upper corners thereof with the notch 50, as best seen in FIG. 5, for a purpose to be hereinafter described.

The dead drawer 33 is supported forwardly and rearwardly movable within the stationary frame 31 by means of the extensible track assemblies, generally indicated at 51 and best seen in FIGS. 3, 9 and 10. As shown, these track assemblies are located between the stationary frame side walls 34 and 35 and the deal drawer main side walls 42 and 43, with the two track assemblies being substantially identical and merely oppositely facing.

Referring to these track assemblies 51, generally C-shaped stationary tracks 52 are secured on the inner surfaces of the stationary frame side walls 34 and 35 and receive the support rollers 53 of the generally C-shaped intermediate tracks 54, which intermediate tracks are positioned telescoped within the stationary tracks 52 and are maintained positioned for proper side clearance from the stationary tracks by a series of nylon bumpers 55. These support rollers 53 of the intermediate tracks 54 can be partially seen in FIGS. 3 and 10, can be seen in side elevation in FIG. 8, and can be seen through hidden lines in side elevation in FIGS. 5 and 6.

Again referring to FIGS. 9 and 10, a series of stub shafts 56 are secured to the deal drawer side walls 42 and 43 and are forwardly and rearwardly mounted, telescoped within the intermediate tracks 54, by means of the balls 57 retained in the ball cages 58. These balls 57 are partially received in the grooves 59 of stub shafts 56 and partially in grooves 60 of the intermediate tracks 54, as shown, with the grooves 60 of the intermediate tracks 54, of course, running the entire lengths of these tracks.

Thus, by providing these extensible track assemblies 51 at both sides of the deal drawer 33, this deal drawer is supported forwardly and rearwardly movable within the stationary frame 31. Furthermore, in view of the extensibility of these track assemblies 51, the deal drawer 33 is supported movable outwardly through the wall opening 25, thereby carrying the deal drawer receptable 39 between the inner and outer sides of the drive-up window wall portion 24, as will be hereinafter more fully described.

In addition to the movable support of the deal drawer 33 in the stationary frame 31 by the extensible track assemblies 51, the deal drawer 33 is provided with both support as well as preferably motive force for such movement by the two gear-rack assemblies, generally indicated at 61 and for the present purposes best seen in FIGS. 3, 5 and 10. Again, as particularly shown in FIG. 3, oppositely disposed gear rack assemblies 61 are provided between the outer sides of the deal drawer side walls 42 and 43 and the inner sides of the stationary frame side walls 34 and 35.

As shown, each of the gear rack assemblies 61 includes an upwardly facing stationary rack 62 secured to the stationary frame bottom wall 36 inward of the stationary frame side wall 34 or 35 and having a support roller surface 63. Further, each assembly 61 includes a movable rack 64 secured to the movable deal drawer side wall 42 or 43 facing downwardly and having a support roller surface 65. Finally each assembly 61 includes a rotatable gear 66 and a rotatable support roller 67, with the support rollers 67 being rotatably mounted on the rotatable drive shaft 68 for forward and rearward movement against the support roller surfaces 65 of the stationary and movable racks 62 and 64, thereby aiding in the movable support of the deal drawer 33 on the stationary frame 31, and also properly positioning the stationary and movable racks 62 and 64 engaged with the gears 66, which gears are secured on the drive shaft 68 rotatable therewith.

The rotatable drive shaft 68 is positioned forwardly and rearwardly rotatably movable beneath the deal drawer bottom wall 48, at all times rearwardly of the receptacle 39, and, as best seen in FIGS. 3, 5 and 10, extends from inward of the stationary frame side wall 34, across beneath the deal drawer bottom wall 48, and through a forwardly and rearwardly extending drive shaft clearance slot 69 in the stationary frame side wall 35. Various drive mechanism for imparting rotation to the drive shaft 68 is provided outward of the stationary frame side wall 35, as will be hereinafter explained in detail.

Thus, through rotation of the drive shaft 68, thereby rotating the gears 66, the deal drawer 33 is moved forwardly and rearwardly of the stationary frame 31 through engagement of the gears 66 with the stationary racks 62 on the stationary frame 31 and the movable racks 64 secured to the deal drawer 33, while additional forward and rearward movable support of the deal drawer 33 on the stationary frame 31 is provided by the support rollers 67. For adding still additional stability to the forward and rearward movement of the deal drawer 33, rollers 70 may be provided rotatably secured to the stationary frame side walls 34 and 35 near the forward ends thereof. These rollers 70 are rotatably engaged with the top surfaces of the movable racks 64 secured to the deal drawer side walls 42 and 43, as best seen in full lines in FIGS. 3, 9 and 10 and shown in hidden lines in FIG. 5.

As best seen in FIGS. 3, 5, and 9 through 11, and of particular importance to the principles of the present invention, a front end member, generally indicated at 71, is provided for the deal drawer 33. Front end member 71 normally closes the wall opening 25 when the deal drawer is at its inner position or positions, and is movable outwardly with the deal drawer when the deal drawer is extended outwardly through the wall opening. As shown, the front end member 71 is formed by the normally generally vertical front wall 72 having the usual peripheral resilient bumper 73, and the spaced generally vertical forwardly and rearwardly extending side flanges 74.

The front end member side flanges 74 are received rearwardly within the openings 46 and 47 between the main deal drawer side walls 42 and 43 and the receptacle side walls 44 and 45. Furthermore, these side flanges are received within the openings 46 and 47 for relative forwardly and rearwardly movement of the drawer 33 and these side flanges during certain periods of movement of the deal drawer.

Each of the side flanges 74 is substantially identical and includes a cover front flange notch 75, a cover control tab mounting notch 76, a rearwardly opening arcuate pivot recess 77, a lower arcuate cam control surface 78, and a generally L-shaped control slot 79. Further, the main pivot rollers 80 are secured at appropriate locations on the inner sides of the deal drawer main side walls 42 and 43 rearwardly aligned with the side flange pivot recesses 77. Thus, these pivot rollers 80 are mounted for reception in the recesses 77 and control of pivotal movement of the front end member 71 relative to the deal drawer 33. This pivotal movement of the front end member takes place after forward movement of the deal drawer relative to the front end member and then forward movement of the front end member outwardly through the wall opening 25 with the deal drawer, as will be hereinafter explained.

Also, the control rollers 81 are likewise secured to the inner sides of the deal drawer main side walls 42 and 43 spaced forwardly and downwardly of the main pivot rollers 80 within the deal drawer openings 46 and 47. Control rollers 81 extend permanently captive in the side flange control slots 79, with these control rollers 81 being for the primary purpose of aiding in controlling and limiting downward pivotal movement of the front end member 71 relative to the deal drawer 33, as will also be hereinafter explained. The free sides of these main pivot rollers 80 and control rollers 81 may be supported by the support bars 82 extending between each set of rollers inward of the side flanges 74, as shown.

Still further, the cam rollers 83 are mounted on the stationary frame bottom wall 36 in locations normally underlying the cam control surfaces 78 of the front end member side flanges 74. These cam rollers 83 are engaged with these cam control surfaces 78 and also aid in controlling positioning and pivotal movement of the front end member 71 during the time when the front end member side flanges 74 extend rearwardly through the wall opening 25 as well as during forward and rearward movement of the front end member and these side flanges through this wall opening, again to be hereinafter explained more in detail.

Figure 12:
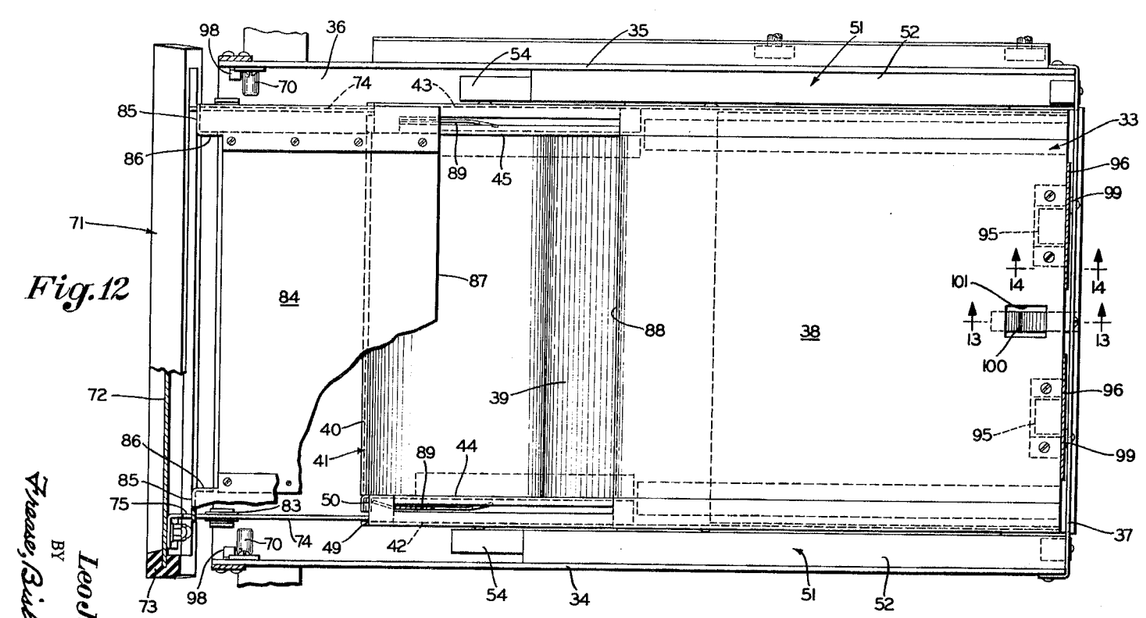
FIG. 12, a reduced fragmentary sectional view, part in elevation and with parts broken away, looking in the direction of the arrows 12—12 in FIG. 9.

As best seen in FIGS. 5, 10 and 12, a pivotally mounted, normally generally horizontally extending cover 84 may be provided for the deal drawer receptacle 39 covering the top opening of this receptacle after the receptacle has been moved forwardly away from the access opening 30 of the teller's counter 29 and is ready to move outwardly through wall opening 25. As shown, this cover 84 is associated with the front end member 71 and is formed with the front downwardly extending flanges 85 at the front corners thereof, normally received in the notches 75 of the front end member side flanges 74.

Figure 6:
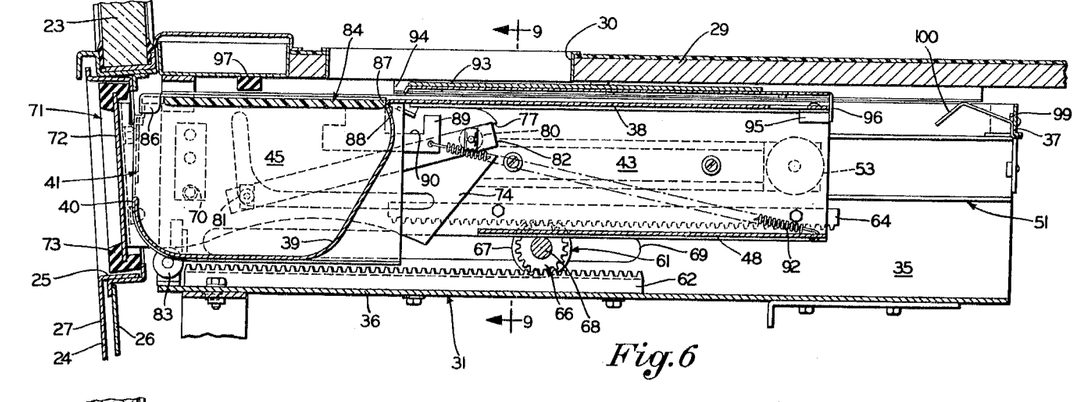
FIG. 6, a view similar to FIG. 5 but showing the deal drawer moved to a forward position engaged with the receptacle cover and front end member, but prior to extension through the wall.

Furthermore, these downwardly extending flanges 85 at the front of the cover 84 are also received in the notches 49 of the deal drawer main side walls 42 and 43 and the notches 50 of the receptacle side walls 44 and 45 when the deal drawer 33 is moved forwardly to the point where the receptacle 39 underlies the cover 84, that is, the position shown in FIG. 6, which will be hereinafter more fully explained. Also in the position of FIG. 6, and as best seen in FIGS. 6 and 10, rearward extensions 86 are formed on these cover front flanges 85 extending rearwardly for inwardly abutting the receptacle side walls 44 and 45.

Figure 7:
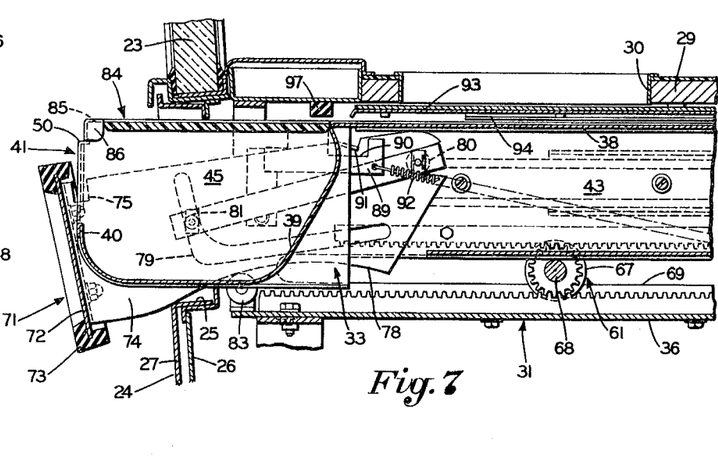
FIG. 7, a view similar to FIG. 5 but with the deal drawer in partially extended position through and outward of the wall.
Figure 8:
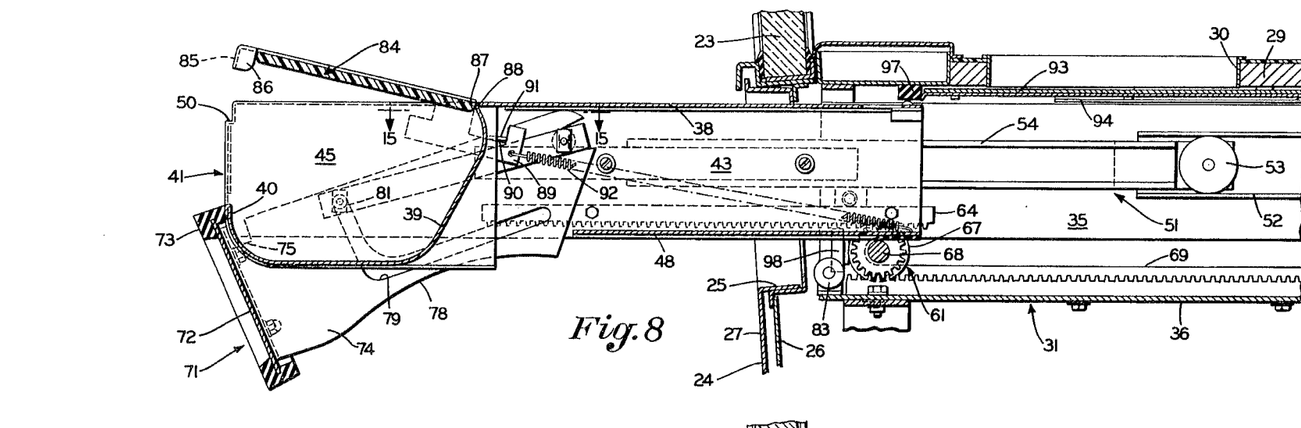
FIG. 8, a view similar to FIG. 5 but with the deal drawer in fully extended position outward of the wall.

For purposes of upward pivotal movement of the cover 84 simultaneously with downward pivotal movement of the front end member 71 after the deal drawer receptacle 39 has been moved forwardly to this position shown in FIG. 6 and the deal drawer 33, along with the front end member 71 and cover 84, have been moved outwardly through the wall opening 25 through the position shown in FIG. 7 and to the position shown in FIG. 8, all of which will be hereinafter explained more in detail, the cover 84 is formed with a rearward pivot surface 87 which, from the position shown in FIG. 6 through the positions of FIGS. 7 and 8, forwardly abuts and bears against a receptacle pivot surface 88 at the upper rearward edge of the receptacle 39. This pivotal movement of the cover 84 is controlled through the generally forwardly and rearwardly extending control plates 89 secured extending forwardly from the cover and extending downwardly between the deal drawer main side walls 42 and 43 and the receptacle side walls 44 and 45 within the openings 46 and 47, as best seen in FIGS. 3, 5 through 10, 12 and 15.

As shown, these control plates 89 are freely pivotal forwardy and rearwardily within the deal drawer openings 46 and 47 for pivotal movement of the cover 84 around its rearward pivot surface 87 when this pivot surface abuts the receptacle pivot surface 88. Further, each of these control plates 89 is formed with an upwardly facing control surface 90 aligned for engagement by control tabs 91 secured to the front end member side flanges 74 within the tab mounting notches 76 and extending over these control surfaces 90. Still further, these control surfaces 90 on the control plates 89 and the control tabs 91 on the front end member side flanges 74 are appropriately formed and positioned for engagement during the latter portion of the downward pivotal movement of the front end member 71 to cause upward pivoting of the cover 84 about the cover rearward pivot surface 87 and the receptacle pivot surface 88.

Also, the cover 84 is normally resiliently urged toward its normal horizontal position by tension springs 92 engaged between each of the cover control plates 89 and the deal drawer bottom wall 48, as shown. These tension springs 92 additionally at all times urge the cover 84 rearwardly, with this rearward movement being resisted by the cover front flanges 85 engaged in the notches 75 of the front end member side flanges 74 during the period when the deal drawer 33 and receptacle 39 are rearwardly of this cover 84, for instance, in the position of FIG. 5 and until the deal drawer and receptacle have moved forwardly to the positions of FIGS. 6, 7 and 8. When the deal drawer 33 and receptacle 39 have moved forwardly into the position of FIG. 6, the receptacle pivot surface 88, has engaged the cover rearward pivot surface 87, urging the cover 84 slightly forwardly to disengage the cover front flanges 85 from the front end member side flanges 74, since the receptacle 39 now takes up the resistance of these tension springs 92 through the abutment of the cover rearward pivot surface 87 and the receptacle pivot surface 88, thereby providing for free pivotal movement of the cover 84 relative to the receptacle 39.

A somewhat usual counter opening cover 93 is mounted forwardly and rearwardly slidable between positions covering the access opening 30 of the teller's counter 29 and free of covering such opening. This slidable mounting is accomplished by the tracks 94 mounted on the underside of the counter 29, as best seen in FIGS. 3, 5 through 9 and 14.

As shown, the forward and rearward movement for the counter opening cover 93 is supplied by the forward and rearward movement of the deal drawer 33, there being a pair of magnets 95 mounted on and beneath the rear edge of the deal drawer top wall 38, also shown in hidden lines in FIG. 12, which attract the appropriately positioned downwardly extending plates 96 at the rearward edge of the cover 93, to thereby provide forward motion of the cover 93 when the deal drawer 33 moves forward. There is a resilient bumper 97 mounted on the underside of the teller's counter 29 spaced forwardly from the access opening 30 of this counter for limiting the forward slidable movement of the cover 93 which, upon being struck by the cover 93, stops forward movement of this cover and breaks the magnetic bond between this cover and the deal drawer 33 as the deal drawer continues its forward movement. The return or rearward movement of the cover 93 is accomplished merely through the abutment of the deal drawer with the cover plates 96 and the deal drawer, merely through this abutment, carries the cover 93 rearwardly along with the normal rearward movement of the deal drawer.

Figure 13:
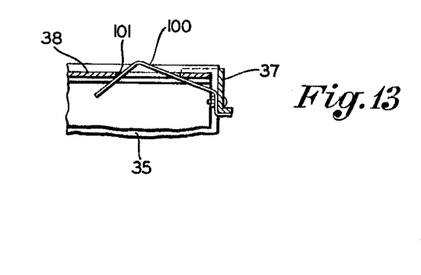
FIG. 13, an enlarged fragmentary sectional view, part in elevation, looking in the direction of the arrows 13—13 in FIG. 12.
Figure 14:
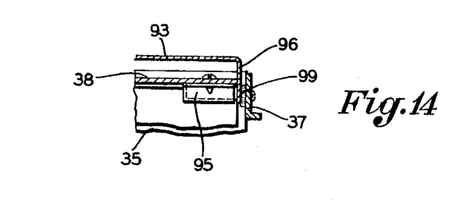
FIG. 14, an enlarged fragmentary sectional view, part in elevation, looking in the direction of the arrows 14—14 in FIG. 12.
Figure 15:
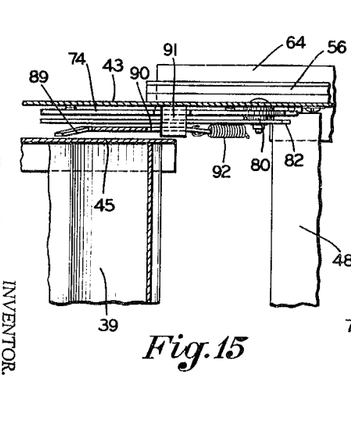
FIG. 15, an enlarged fragmentary sectional view, part in elevation, looking in the direction of the arrows 15—15 in FIG. 8.
Figure 16:
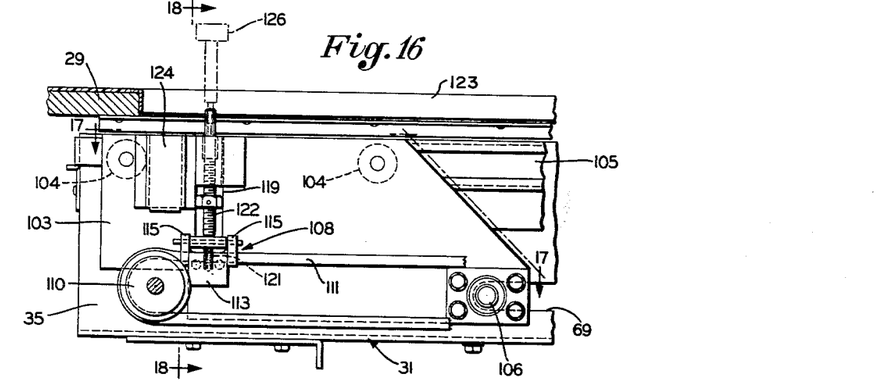
FIG. 16, a fragmentary sectional view, part in elevation, looking in the direction of the arrows 16—16 in FIG. 3.
Figure 17:
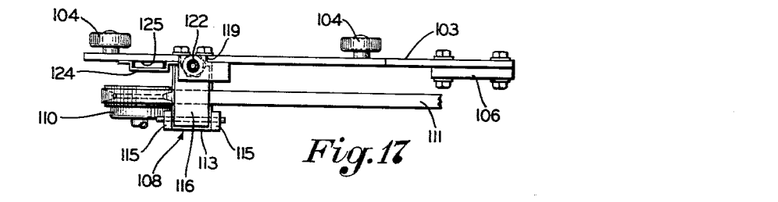
FIG. 17, a fragmentary sectional view, part in elevation, looking in the direction of the arrows 17—17 in FIG. 16.
Figure 18:
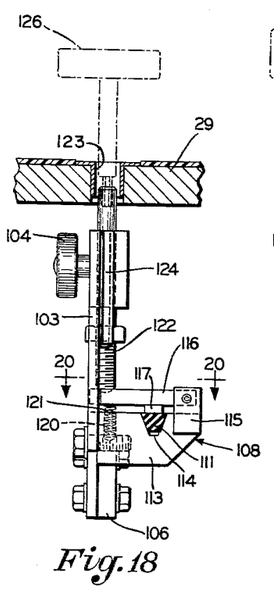
FIG. 18, an enlarged fragmentary sectional view, part in elevation, looking in the direction of the arrows 18—18 in FIG. 16.
Figures 19, 20:
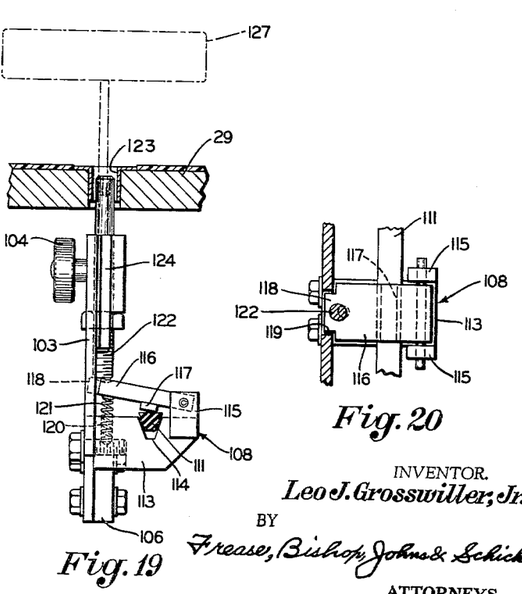
FIG. 19, a view similar to FIG. 18 but with the power driving mechanism released.
FIG. 20, a fragmentary sectional view, part in elevation, looking in the direction of the arrows 20—20 in FIG. 18.

Various appropriate bumpers may be provided where desired to cushion the movement of the various elements of the present construction, for instance, resilient bumpers 98 may be mounted at the front portion of the stationary frame 31, as best seen in FIG. 8, forwardly and rearwardly aligned with and for stopping the forward motion of the rollers 67 on the gear-rack assemblies 61. Furthermore, bumpers 99 may be mounted on the stationary frame rear flange 37 for stopping and cushioning the rearward movement of the deal drawer 33 and customer opening cover 93, as shown in FIGS. 12 and 14. Still further, a spring latch 100 may be provided on this stationary frame rear flange 37 releasably engageable with deal drawer 33 through an opening 101 in the deal drawer top wall 38 for releasably latching the deal drawer in its rearmost position, as best seen in FIGS. 12 and 13.

As hereinbefore pointed out, the forward and rearward force for forward and rearward movement of the deal drawer 33 is supplied through the extensible track assemblies 51, with such power originating in forward and rearward movement and rotation of the drive shaft 68 of these assemblies. For the moment, it is sufficient to say that the movement and rotation of the drive shaft 68 is preferably supplied by electrical power, with mechanism for emergency conversion to hand operation in the event of an electrical power failure, all of which will be later described in detail, but either of which accomplishes the same identical forward and rearward movement of the deal drawer 33 and its associated parts, the operation of which will now be described.

The sequence of forward and rearward movement of the deal drawer 33 and its associated elements is best seen in FIGS. 5, 6, 7 and 8. As shown in FIG. 5, the deal drawer 33 is in its rearmost position with the receptacle 39 underlying the counter opening 30, and the counter opening cover 93 is in its rearmost position underlying the counter 29 and rearwardly of opening 30 due to the abutment of the cover plates 96 with the deal drawer magnets 95 at the rear edge of the deal drawer top wall 38.

At this time, the movable racks 64 on the deal drawer main side walls 42 and 43 are in their rearmost positions relative to the gears 66 of these gear rack assemblies 61, and the gears 66 are in turn at the rearward ends of the stationary racks 62 on the stationary frame bottom wall 36, with the drive shaft 68 being near the rearward end of the slot 69 in the stationary frame side wall 35. Furthermore at this time, the main pivot rollers 80 on the deal drawer main side walls 42 and 43 are spaced rearwardly of the pivot recesses 77 on the front end member side flanges 74, the control rollers 81 on the deal drawer main side walls 42 and 43 are at the rearward ends of the L-shaped control slots 79 on the front end member side flanges 74, the front end member front wall 72 is positioned closing the wall opening 25, the cam rollers 83 on the stationary frame 31 are engaged with the cam control surfaces 78 on the front end member side flanges 74 maintaining the front end member 71 properly forwardly aligned positioned closing the wall opening 25, and the front flanges 85 of the pivotal cover 84 are engaged in the notches 75 of the front end member side flanges 74 retaining this cover 84 forward with the front end member 71 for the main part forwardly of the counter opening 30 and despite the rearward urging of the tension springs 92.

Thus, at this time, the front end member 71 securely closes the wall opening 25 and cannot be pulled forwardly out of this opening due to the control rollers 81 on the deal drawer main side walls 42 and 43 being at the rearward ends of the control slots 79 in the front end member side flanges 74. At the same time, the receptacle 39 is freely accessible to the teller through the counter opening 30, since the pivotal cover 84 is for the main part forwardly thereof.

Beginning forward movement of the deal drawer 33, as shown in FIG. 6, the deal drawer has moved forwardly so that the receptacle 39 is rearwardly adjacent the front wall 72 of the front end member 71, at which time, the main pivot rollers 80 on the deal drawer have engaged in the pivot recesses 77 on the front end member side flanges 74 and the rearward pivot surface 87 of the pivotal cover 84 has engaged the receptacle pivot surface 88. This not only pivotally connects the deal drawer 33 and front end member 71, but positions the receptacle 39 directly under and upwardly closed by the pivotal cover 84, and at the same time, moves this cover a slight distance forwardly to disengage the cover front flanges 85 from the front end member side flanges 74.

At this time, the front end member 71 still remains in position closing the wall opening 25, having been retained in such position up to this point through its engagement with the pivotal cover 84 and the rearward urging of the tension springs 92 engaged with the pivotal cover, and this is despite the fact that the control rollers 81 on the deal drawer 33 have moved forwardly in and have reached the front edges of the L-shaped control slots 79 of the front end member side flanges 74.

This forward movement has, of course, been produced by forward urging and rotation of the drive shaft 68 of the gear-rack assemblies 61, causing the gears 66 to move forwardly along the stationary racks 62 on the stationary frame bottom wall 36 and in turn causing the deal drawer 33 to move forwardly by forward movement of the movable racks 64 secured to the deal drawer main side walls 42 and 43. Finally, at this point, the counter opening cover 93 has moved forwardly with the deal drawer 33 so that this cover now partially closes the counter opening 30 due to the magnetic connection between the deal drawer magnets 95 and the cover downwardly extending plates 96.

Continuing forward movement of the deal drawer 33, as shown in FIG. 7, the deal drawer has now picked up the receptacle cover 84 and the front end member 71, carrying the receptacle cover and front end member forwardly exactly with the movement of the deal drawer, as maintained by the pivotal connections previously described. This forward movement of the front end member 71 causes the front end member side flanges 74 to move forwardly relative to the cam rollers 83 mounted at the forward set locations on the stationary frame 31, so that the cam control surfaces 78 of the front end member side flanges 74 have moved forwardly along these rollers 83 and, due to the progressively recessed contour of these cam control surfaces, the front end member 71 has begun to pivot downwardly relative to the deal drawer 33 and particularly the receptacle 39. This downward pivotal movement of the front end member 71 is not obstructed by the control rollers 81 on the deal drawer main side walls 42 and 43, since these rollers are now received upwardly within the L-shaped control slots 79 of the front end member side flanges 74, that is, these side flanges are permitted to move downwardly relative to the control rollers.

This downward pivoting of the front end member 71 is, of course, about the pivot axis located spaced rearwardly from the front end member front wall 72, preferably rearwardly of the deal drawer receptacle 39, as established by the main pivot rollers 80 on the deal drawer main side walls 42 and 43 engaged in the pivot recesses 77 of the front end member side flanges 74. Furthermore, this downward pivoting of the front end member 71 relative to the deal drawer 33 and receptacle 39 is maintained exactly controlled for proper continued forward movement of the deal drawer 33 through the wall opening 25 by the stationary frame cam rollers 83 against the cam control surfaces 78 of the front end member side flanges 74, as previously described.

As can be seen in FIG. 7, this downward pivoting of the front end member 71 has moved the front wall 72 of this front end member downwardly relative to the deal drawer receptacle 39 and has begun forwardly exposing the front opening 41 of this receptacle, while at the same time, the receptacle cover 84 is still maintained closed over the top of the receptacle 39 by rearward resilient urging of the tension springs 92, since the control tabs 91 secured to and pivoting downwardly with the front end member side flanges 74 have not yet come into contact with the control surfaces 90 of the control plates 89 on the receptacle cover 84. Finally, at this point, the counter opening cover 93 has continued to move forwardly with the deal drawer 33 and has not yet reached the bumper 97 on the teller's counter 29, but this counter opening cover has moved forwardly a sufficient distance to completely close off the counter opening 30.

The final forward movement of the deal drawer 33 through the wall opening 25 is to the position shown in FIG. 8, with this forward movement being limited by the support rollers 67 of the gear-rack assemblies 61 striking and abutting forwardly against the bumpers 98 mounted at the forward end of the stationary frame 31. In this position, cam rollers 83 on the stationary frame 31 have passed completely along the cam control surfaces 78 of the front end member side flanges 74, that is, these side flanges have moved completely past these rollers and are now spaced forwardly of the wall portion 24 outwardly of the wall opening 25, so that, due to the particular arcuate convex configuration of these cam control surfaces 78, the front end member 71 has been permitted to and been guided in downward pivotal movement, such downward pivotal movement being limited by the maximum upward extent of the L-shaped control slots 79 in the front end member side flanges 74 and the engagement of the deal drawer control rollers 81 therein.

As can be seen in FIG. 8, when the front end member 71 is pivoted downwardly this maximum extent, the top edge of the bumper 73 on the front end member front wall 72 is approximately at the location of the upward extent of the receptacle flange 40, thereby totally exposing the receptacle front opening 41 to permit substantially complete front access to the receptacle 39 by a customer at the outer side of the drive-up window 21. Also, as the front end member 71 completes the latter portion of its downward pivotal movement, the control tabs 91 on the front end member side flanges 74 engage the control surfaces 90 of the control plates 89 on the receptacle cover 84, so that the latter phase of the downward pivotal movement of the front end member pivots the cover 84 upwardly around the pivot axis established by the abutment of the cover rearward pivot surface 87 against the receptacle pivot surface 88 and in opposition to the resilient force of the cover tension springs 92, thereby providing limited vertical access to the receptacle 39 by the customer.

It is further pointed out that if even greater vertical access to the receptacle 39 is desired by the customer, it is merely necessary for the customer to urge the cover 84 to pivot a greater extent upwardly, since this further pivoting of the cover is only resisted by the resilient force of the cover tension springs 92. Also, during this latter phase of outer movement of deal drawer 33, the front edge of the counter opening cover 93, which was travelling with the deal drawer, has struck the bumper 97 on the undersurface of the counter 29, thereby halting forward movement of this cover and breaking the magnetic bond between the cover rear plates 96 and the deal drawer magnets 95, so that this cover thereafter remains in this position totally closing counter opening 30 while the deal drawer 33 continues and completes its forward movement.

Thus, during the early portion of the movement of the deal drawer 33 and receptacle 39 thereof through the wall opening 25, the receptacle cover 84 remains closed over the normally open top of this receptacle, and this is true even though the front end member 71 has begun to pivot downwardly and thereby begun to expose the receptacle front opening 41. Furthermore, when the deal drawer 33 has completed its forward movement, the front end member 71 has automatically pivoted downwardly to substantially completely expose the receptacle front opening 41, and at the same time, the receptacle cover 84 has automatically pivoted upwardly to provide substantially complete front access and at least partial vertical access to the receptacle 39 by a customer.

The return movement of the deal drawer 33 from this fully extended position outward of the wall portion 24, as shown in FIG. 8, to the totally inward position in which the front end member 71 closes the wall opening 25 and the receptacle 39 is accessible to the teller through the counter opening 30 of the counter 29 at the inner side of the wall portion 24, as shown in FIG. 5, is substantially merely the reverse motion and operation as has just been described, with a few minor exceptions. The return movement of the deal drawer 33 caused by the reverse movement of the gear-rack assembly 61 results in the front end member 71 and receptacle cover 84 remaining in their pivoted positions shown in FIG. 8, until the cam control surfaces 78 on the front end member side flanges 74 engage the cam rollers 83 on the stationary frame 31, at which time, the upward pivotal movement of the front end member is commenced and the downward pivotal movement of the receptacle cover is commenced.

Ultimately, the downward pivotal movement of the receptacle cover 84 is completed and thereafter, the upward pivotal movement of the front end member 71 is completed, after which, the wall opening 25 is closed by this front end member in the position shown in FIG. 6. Shortly, prior to this period in the return movement of the deal drawer 33, the rear edge of the deal drawer top wall 38 or the magnets 95 thereon have engaged the plates 96 of the counter opening cover 93, thereby beginning to carry this counter opening cover rearwardly with the deal drawer.

During this upward pivotal movement of the front end member 71, the control slots 79 in the front end member side flanges 74 have moved upwardly relative to the control rollers 81 on the deal drawer 33 so that, at this time, these rollers are at lower extent of these front end member slots. Thus, further rearward movement of the deal drawer 33 causes the front end member 71 and the receptacle cover 84 to separate from the deal drawer and remain substantially stationary, while the deal drawer main pivot rollers 80 move rearwardly out of the front end pivot recesses 77 and the deal drawer rollers 81 move rearwardly along the lower extent of the front end member L-shaped control slots 79.

After separation of the front end member 71 and receptacle cover 84 from the deal drawer 33, the receptacle cover 84 moves slightly rearwardly, as urged by the cover tension springs 92, so that the receptacle cover front flanges 85 engage against the front end member side flanges 74 within the side flange notches 75. Thereafter, during the latter phases of the rearward movement of the deal drawer 33, the receptacle cover tension springs 92 not only urge the receptacle cover 83 to remain in closed position, but also urge the front end member 71 rearwardly, to thereby remain in position closing the wall opening 25.

Finally, with the front end member 71 and the receptacle cover 84 remaining substantially stationary, the deal drawer 33 completes its inward or rearward movement until, in the position shown in FIG. 5, the receptacle 39 underlies and is accessible through the counter opening 30, since the receptacle cover 84 has remained in its forward position engaged with the front end member 71 and the counter opening cover 93 has been moved by the deal drawer rearwardly of the counter opening. At the termination of this rearward movement of the deal drawer 33, the plates 96 of the counter opening cover 93 strike the bumpers 99 and stationary frame latch 100 engages with the deal drawer opening 101. Also, and most important, the deal drawer control rollers 81 reach the rearward extent of the L-shaped control slots 79 on the front end member side flanges 74, to thereby securely retain the front end member 71 in its position closing the wall opening 25.

As previously pointed out, the drive mechanism for the deal drawer construction of the present invention is operably connected to the drive shaft 68 of the gear-rack assemblies 61 and, as best seen in FIGS. 3, 4 and 16 through 20, is mounted outwardly adjacent the stationary frame side wall 35, partially on this side wall and partially on horizontal extensions of stationary frame 31. This deal drawer drive mechanism is generally indicated at 102 and includes a generally vertically extending forwardly and rearwardly movable drive carriage 103.

Drive carriage 103 is mounted forwardly and rearwardly movable along the stationary frame side wall 35 by the forwardly and rearwardly spaced rollers 104 rotatably received in a generally C-shaped carriage track 105 mounted on and near the upper edge of the outer side of the stationary frame side wall 35. The drive shaft 68 of the deal drawer gear-rack assemblies 61 extends through the drive shaft clearance slot 69 of the stationary frame side wall 35 and is journaled in the drive carriage 103 by the bearing block assembly 106 at the lower forward corner of the drive carriage 103.

Thus, forward and rearward movement of the drive carriage 103 along the stationary frame side wall 35 forces the drive shaft 68 forwardly and rearwardly along the stationary frame slot 69 and, since this drive shaft is secured to the gears 66 of the gear-rack assembly 61, this forward and rearward movement of drive carriage 103 rotates the drive shaft 68 and gears 66 causing the forward and rearward movement of the deal drawer 33 as hereinbefore described. Forward and rearward movement of this drive carriage 103 is preferably supplied from a usual gear reduction reversible electric motor 107 through a unique V-belt engagement means, generally indicated at 108, which is selectively releasable in a unique manner for hand operation of the deal drawer construction in the event of electrical power failure. Furthermore, the motor 107 may be controlled in the usual known manner by various limit switches (not shown) and the teller's main control switch 109 on the teller's counter 29, as illustrated in FIG. 2.

As shown, the motor 107 is provided with a usual V-belt pulley 110 receiving and driving a usual V-belt 111, which V-belt is also received tensioned about an idler V-belt pulley 112 journaled on the extension of the stationary frame 31 in usual manner. A belt engagement block 113 is secured extending laterally from the drive carriage 103 and underlying the top strand of the V-belt 111, with this belt engagement block having a forwardly and rearwardly extending and upwardly opening generally V-shaped belt engagement recess 114 formed therein, constructed to wedgingly receive this top strand of V-belt 111.

Spaced laterally outwardly from this belt engagement recess 114, the block 113 is formed with the forwardly and rearwardly spaced upwardly extending pivot tabs 115 which vertically pivotally mount a belt engagement bar 116 extending from these tabs 115 laterally back to the drive carriage 103, overlying the top strand of V-belt 111.

Directly above the V-belt 111 and on the undersurface thereof, this pivotal belt engagement bar 116 is formed with a pressure pad 117, and at the inner end with a reduced portion 118 which extends laterally into and is generally vertically pivotally movable in a generally vertically extending slot 119 formed through the drive carriage 103. Adjacent the drive carriage 103 and directly underlying the belt engagement bar 116, the belt engagement block 113 is formed with a spring recess 120 for receiving the lower end of the compression spring 121, which compression spring is upwardly engaged with the undersurface of the belt engagement bar 116, thereby normally resiliently urging this bar 116 to pivot upwardly relative to the belt engagement block 113.

A vertically extending pressure screw 122 is threadably mounted vertically threadably movable on the drive carriage 103, directly overlying and engageable with the pivotal belt engagement bar 116, with this screw 122 also extending vertically upwardly above the drive carriage 103 and into a forwardly and rearwardly extending drive slot 123 formed through the teller's counter, again also shown in FIG. 2. Finally, a handle engagement strap 124 is mounted on the drive carriage 103 rearwardly of the pressure screw 122 and having an upwardly opening handle slot 125 formed therein, also vertically aligned with the drive slot 123 of the teller's counter 29.

Thus, for electrical power operation of the deal drawer construction of the present invention, the pressure screw 122 is threaded downwardly by usual tool means 126 to bear against and downwardly pivot the pivotal belt engagement bar 116 against the resilient force of the compression spring 121. This causes the pressure pad 117 of the belt engagement bar 116 to engage the top strand of the V-belt 111 and force this V-belt to wedge downwardly into the belt engagement recess 114 of the belt engagement block 113, thereby establishing a drive connection between the V-belt 111 and the drive carriage 103 for moving this drive carriage to move the gear-rack assemblies 61 and consequently drive the deal drawer 33.

In the event of electrical power failure, or when it is otherwise desirable to hand operate the deal drawer construction of the present invention, it is merely necessary to thread the pressure screw 122 upwardly by the tool means 126, thereby permitting upward pivotal movement of the belt engagement bar 116 which will be urged to pivot upwardly by the compression spring 121. This in turn will release the downward wedging pressure against the V-belt 111 within the recess 114 of the belt engagement block 113, permitting the V-belt to move free of this belt engagement block. With the drag of the gear reduction motor 107 removed, it is only necessary to then insert a usual handle 127 downwardly through the drive slot 123 in the teller's counter 29 and into the handle slot 125 of the engagement strap 124, to thereby provide hand movement of the drive carriage 103 and thus hand operation of the deal drawer 33.

It is pointed out that, due to the unique construction of this V-belt engagement means 108 between the drive carriage 103 and the V-belt 111 of the motor 107, a secure wedging engagement is provided between the V-belt 111 and the drive carriage 103 by the pivotal belt engagement bar 116 forcing the V-belt down into the belt engagement recess 114 and therefore into wedging engagement with the block 113. At the same time, for conversion from power to hand operation, the V-belt 111 may be quickly released from engagement with this belt engagement block 113, thereby quickly and conveniently interrupting the connection between the drive carriage 103 and the gear reduction motor 107.

Thus, according to the principles of the present invention, a deal drawer construction for bank drive-up windows is provided having a front end member 71 on the deal drawer 33 normally forming a front closure for the receptacle 39 of the deal drawer during initial movement of the deal drawer through the wall opening 25 of the drive-up window 21, but which front end member 71 automatically pivots downwardly to expose a front opening 41 of the receptacle 39 as the deal drawer moves outwardly of the wall 22 to its fully extended position. Furthermore, according to the principles of the present invention, a cover 84 may be provided for the deal drawer receptacle 39 vertically closing the receptacle during the initial movement of the deal drawer 33 through the wall opening 25, but which cover automatically pivots upwardly for at least partially vertically exposing the receptacle during the final outward movement of the deal drawer. In this manner, virtually complete front access as well as at least limited vertical access to the receptacle 39 is provided for a customer, thereby eliminating the difficulties encountered with prior construction occasioned by customers being seated in automobiles of various heights.

It will be particularly noted that, in view of the pivot axis for the front end member 71 being established spaced rearwardly of the front end member front wall 72 and preferably even spaced rearwardly of the receptacle 39, as provided by the main pivot rollers 80 on the deal drawer main side walls 42 and 43 engaged in the pivot recesses 77 on the front end member side flanges 74, the downward movement of the front end member front wall 72 for substantially completely exposing the receptacle front opening 41 is bodily edgewise downward movement of this front wall 72, so that during such downward movement, the upper end lower edges of the front wall 72 move simultaneously downwardly. Stated in another manner, this bodily edgewise downward movement of the front end member front wall 72 is such that the lower edge of the front wall moves from a position generally forwardly aligned with the lower portion of the deal drawer receptacle 39, downwardly to a position spaced substantially below this receptacle 39, while at the same time, the upper edge of front wall 72 moves simultaneously with the lower edge thereof and thereby moves from a position generally forwardly aligned with the top portion of receptacle 39, downwardly to a position substantially downwardly exposing the receptacle front opening 41.

The clear advantage of this form of movement of the front end member 71 is that, not only is the receptacle front opening 41 properly exposed for providing free access by the customer front endwise into the receptacle 39, but this exposure or opening of the receptacle front opening is accomplished by no increased protrusion from the front of the deal drawer 33, so that there is nothing moving outwardly beyond the normal movement of the deal drawer which could strike a customer or the customer's automobile. Thus, according to the principles of the present invention, this automatic front opening of the receptacle 39 is accomplished without incurring this objectionable disadvantage.

Also, according to the principles of the present invention, a unique deal drawer drive mechanism 102 is provided with which the deal drawer 33 may be driven in its forward and rearward movement by the usual gear reduction electric motor 107, yet unique V-belt engagement means 108 is provided between this motor 107 and deal drawer 33 for selective convenient disengagement in the event of an electrical power failure, to thereby permit hand movement of the deal drawer 33. Such V-belt engagement means 108 is formed by the belt engagement block 113 mounting the pivotal belt engagement bar 116 for wedge engaging a driving V-belt 111 within the block engagement recess 114, as selectively controlled by the pressure screw 122.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein by way of example and the scope of the present invention is not limited to the exact details of construction shown.

Having now described the invention, the construction, operation and use of the preferred embodiment thereof, and the advantageous new and useful results obtained thereby, the new and useful construction and reasonable mechanical equivalents thereof obvious to those skilled in the art are set forth in the appended claims.

I claim:

1. In deal drawer construction for use with bank drive-up windows of the type in which a wall having inner and outer sides is formed with a drawer opening, in which a deal drawer is mounted on a stationary frame at the inner side of the wall movable through the drawer opening between the inner and outer sides of the wall, and in which there is a receptacle formed in the deal drawer accessible to a teller when the deal drawer is moved through the drawer opening to the inner side of the wall and accessible to a customer when the deal drawer is moved through the wall opening to the outer side of the wall; the improvements including a carriage operably connected to the stationary frame forwardly and rearwardly movable on the stationary frame, means operably connected to the carriage and to the deal drawer for moving the deal drawer forwardly through the wall opening upon forward movement of the carriage and for moving the deal drawer rearwardly through the wall opening upon rearward movement of the carriage, a reversible electrical drive motor, V-belt means operably connected to the drive motor for forward and rearward movement by the drive motor, the V-belt means being mounted forwardly and rearwardly movable adjacent the stationary frame movable carriage, a belt engagement block mounted on the stationary frame extending to and underlying the V-belt means, a forwardly and rearwardly extending wedge-shaped belt engagement recess formed in the belt engagement block opening upwardly and aligned with the V-belt means, a belt engagement bar pivotally connected to the belt engagement block at a side of the belt engagement recess opposite from the stationary frame carriage and extending over the V-belt means and belt engagement recess terminating at the stationary frame movable carriage, means on the belt engagement bar engageable with the V-belt means for forcing V-belt means to wedge downwardly in the belt engagement recess upon downward pivotal movement of the belt engagement bar to thereby establish driving connection between the V-belt means and stationary frame movable carriage, means on the stationary frame movable carriage, means in the stationary frame movable carriage selectively adjustable downwardly against the belt engagement bar for downwardly pivoting the belt en-belt engagement bar for downwardly pivoting the belt engagement bar to wedge the V-belt means in the belt engagement recess, resilient means operably connected to the belt engagement bar for pivoting the belt engagement bar upwardly to release the V-belt means from the belt engagement recess upon selective release of the downward adjustable means on the stationary frame movable carriage, and hand operated means operably connected to the stationary frame movable carriage for moving said carriage forwardly and rearwardly by hand to thereby move the deal drawer forwardly and rearwardly by hand in the event of an electrical power failure and upon release of the V-belt means from wedging engagement in the belt engagement recess of the belt engagement block.

2. In deal drawer construction for use with bank drive-up windows of the type in which a window wall having inner and outer sides is formed with a drawer opening, in which a deal drawer is mounted on a stationary frame movable through the wall opening between the inner and outer sides of the window wall, and in which there is means operably connected to the drawer for selectively moving the drawer through the wall opening between an inner position accessible to a teller and an outer position accessible to a customer; the improvements including, a receptacle formed in the deal drawer having at least a partially open front providing front access to the receptacle, a front end member having a front wall with upper and lower edges, means operably connecting the front end member to the deal drawer for movement of at least the front end member front wall between an upper position with the front wall generally forwardly aligned with and closing the receptacle front at least when the deal drawer is inward of the window wall and a lower position with the front wall moved edgewise bodily downwardly simultaneously moving both the upper and lower edges of the front wall downwardly and substantially exposing the receptacle front when the deal drawer is moved outwardly through the window wall opening, and means operably connected to the front end member for at least controlling the edgewise downward bodily movement of the front end member front wall during movement of the deal drawer outwardly through the window wall opening and for moving the front end member front wall edgewise bodily upwardly from said lower position to said upper aligned position during movement of the deal drawer rearwardly through the window wall opening.

3. Deal drawer construction as defined in claim 2 wherein the means operably connecting the front end member to the deal drawer for the edgewise bodily movement between the front end member front wall and deal drawer includes means for releasing said operable connection upon rearward movement of the deal drawer receptacle from the window wall opening and for re-engaging said operable connection upon forward movement of the deal drawer receptacle to the window wall opening; wherein there is means engageable with the front end member for stopping rearward movement of the front end member at and closing the window wall opening during rearward movement of the deal drawer through the window wall opening; and wherein the means for selectively moving the deal drawer moves the deal drawer to a rearward position with the receptacle spaced rearwardly from the front end member front wall upon release of the operable connection of the front end member from the deal drawer and moves the deal drawer forwardly into re-engagement of the operable connection of the deal drawer with the front end member.

4. Deal drawer construction as defined in claim 2 wherein the deal drawer receptacle is formed at least partially upwardly open; wherein a receptacle cover is mounted on the deal drawer over the receptacle pivotally movable between a closed position upwardly closing the receptacle and an open position at least partially upwardly opening the receptacle; and wherein there is means operably connecting the front end member and receptacle cover for pivoting the receptacle cover to open position during movement of the front end member front wall downwardly to lower position and at least controlling pivotal movement of the receptacle cover to closed position during movement of the front end member front wall upwardly to upper position.

5. Deal drawer construction as defined in claim 2 wherein the means operably connecting the front end member to the deal drawer for the edgewise bodily movement between the front end member front wall and deal drawer includes means for releasing said operable connection upon rearward movement of the deal drawer receptacle through the window wall opening and for re-engaging said operable connection upon forward movement of the deal drawer receptacle to the window wall opening; wherein there is means engageable with the front end member for stopping rearward movement of the front end member front wall at and closing the window wall opening during rearward movement of the deal drawer through the window wall opening; wherein the means for selectively moving the deal drawer moves the deal drawer to a rearward position with the receptacle spaced rearwardly from the front end member front wall upon release of the operable connection of the front end member from the deal drawer and moves the deal drawer forwardly into re-engagement of the operable connection of the deal drawer with the front end member; wherein the deal drawer receptacle is formed at least partially upwardly open; wherein a receptacle cover is mounted on the deal drawer over the receptacle pivotally movable between a closed position upwardly closing the receptacle and an open position at least partially upwardly opening the receptacle; wherein there is means operably connecting the front end member and receptacle cover for pivoting the receptacle cover to open position during movement of the front end member front wall downwardly to lower position and at least controlling pivotal movement of the receptacle cover to closed position during movement of the front end member front wall upwardly to upper position; and wherein there is means operably connected to the receptacle cover and front end member for separating the receptacle cover from the pivotal mounting on the deal drawer and retaining the receptacle cover with the front end member upon the stopping of rearward movement of the front end member front wall at and closing the window wall opening and movement of the deal drawer toward rearward position, and for re-establishing the pivotal mounting of the receptacle cover on the deal drawer over the receptacle upon forward movement of the deal drawer into re-engagement with the front end member.

6. In deal drawer construction for use with bank drive-up windows of the type in which a window wall having inner and outer sides is formed with a drawer opening, in which a deal drawer is mounted on a stationary frame movable through the wall opening between the inner and outer sides of the window wall, and in which there is means operably connected to the drawer for selectively moving the drawer through the wall opening between an inner position accessible to a teller and an outer position accessible to a customer; the improvements including, a receptacle formed in the drawer having at least a partially open front providing front access to the receptacle, a front end member having a front wall with upper and lower edges, pivot means spaced rearwardly from the front end member front wall and the receptacle open front operably connecting the front end member to the deal drawer for movement of at least the front end member front wall between an upper position with the front wall generally forwardly aligned with and closing the receptacle front at least when the deal drawer is inward of the window wall and a lower position with the front wall pivoted edgewise bodily downwardly simultaneously moving both the upper and lower edges of the front wall downwardly and substantially exposing the receptacle front when the deal drawer is moved outwardly through the window wall opening, and means operably connected to the front end member for at least controlling the pivotal edgewise downward bodily movement of the front end member front wall during movement of the deal drawer outwardly through the window wall opening and for moving the front end member front wall pivotally edgewise bodily upwardly from said lower position to said upper aligned position during movement of the deal drawer rearwardly through the window wall opening.

7. Deal drawer construction as defined in claim 6 wherein the front end member includes spaced upstanding side flanges connected to the front wall and extending rearwardly; wherein the pivot means operably connecting the front end member to the deal drawer is formed partially by the front end member side flanges with said side flanges extending rearwardly along the deal drawer receptacle for the edgewise downward and upward bodily movement of the front end member front wall relative to the receptacle front; wherein the pivot means operably connecting the front end member and deal drawer includes means for releasing the pivot means between the front end member and deal drawer positioning the front end member front wall at the window wall opening when the deal drawer receptacle is moved rearwardly through and rearwardly from the wall opening and for re-engaging the pivot means upon movement of the deal drawer receptacle forwardly to the wall opening; and wherein the means for moving the deal drawer moves the deal drawer rearwardly to a position with the receptacle spaced rearwardly from the front end member front wall and forwardly to a position with the receptacle rearwardly adjacent the front end member front wall.

8. Deal drawer construction as defined in claim 6 wherein the front end member includes spaced upstanding side flanges connected to the front wall and extending rearwardly; wherein the pivot means operably connecting the front end member to the deal drawer includes rearwardly opening pivot recesses formed in the front end member side flanges and pivot members mounted on the deal drawer rearwardly aligned with the front end member pivot recesses; wherein the deal drawer pivot members are engaged in the front end member pivot recesses with the front end member side flanges extending rearwardly along the deal drawer receptacle during the edgewise downward and upward bodily movement of the front end member front wall relative to the receptacle front; wherein the deal drawer pivot members move rearwardly out of the front end member pivot recesses releasing the pivotal connection between the front end member and deal drawer and positioning the front end member front wall at the window wall opening when the deal drawer receptacle is moved rearwardly through and rearwardly from the window wall opening, and re-engage for pivotal connection upon movement of the deal drawer receptacle forwardly to the wall opening; and wherein the means for moving the deal drawer moves the deal drawer rearwardly to a position with the receptacle spaced rearwardly from the front end member front wall and forwardly into a position with the receptacle rearwardly adjacent the front end member front wall.

9. Deal drawer construction as defined in claim 6 wherein the means operably connected to the front end member controlling the pivotal edgewise downward and upward bodily movement of the front end member front wall includes cam roller means mounted on the stationary frame inward of the window wall opening movably engaged with cam means formed on the front end member, the cam means moving outwardly and inwardly along the cam roller means during movement of the deal drawer and front end member outwardly and inwardly through the wall opening, and the cam means having cam surface means for controlling the pivotal edgewise downward bodily movement of the front end member front wall during movement of the deal drawer and front end member outwardly through the wall opening and for moving the front end member front wall pivotally edgewise bodily upward to said aligned position during movement of the deal drawer and front end member inwardly through the wall opening.

10. Deal drawer construction as defined in claim 6 wherein the front end member includes spaced upstanding side flanges connected to the front wall and extending rearwardly; wherein the pivot means operably connecting the front end member to the deal drawer is formed partially by the front end member side flanges with said side flanges extending rearwardly along the deal drawer receptacle for the edgewise downward and upward bodily movement of the front end member front wall relative to the receptacle front; wherein the pivot means operably connecting the front end member and deal drawer includes means for releasing the pivot means between the front end member and deal drawer positioning the front end member front wall at the window wall opening when the deal drawer receptacle is moved rearwardly through and rearwardly from the wall opening and for re-engaging the pivot means upon movement of the deal drawer receptacle forwardly to the wall opening; wherein the means for moving the deal drawer moves the deal drawer rearwardly to a position with the receptacle spaced rearwardly from the front end member front wall and forwardly to a position with the receptacle rearwardly adjacent the front end member front wall; and wherein the means operably connected to the front end member controlling the pivotal edgewise downward and upward bodily movement of the front end member front wall includes a generally L-shaped slot formed in at least one of the front end member side flanges having a normally generally horizontally extending slot portion and a normally generally vertically extending slot portion, a control member mounted on the deal drawer movably engaged in the L-shaped slot of the front end member side flange movable in the horizontal slot portion during movement of the deal drawer forwardly and rearwardly of the front end member while the deal drawer is inward of the window wall opening and movable in the vertical slot portion during downward and upward edgewise bodily movement of the front end member front wall while the deal drawer is moving outwardly through and rearwardly through the wall opening.

11. Deal drawer construction as defined in claim 6 wherein the front end member includes spaced upstanding side flanges extending rearwardly; wherein the pivot means operably connecting the front end member to the deal drawer includes rearwardly opening pivot recesses formed in the front end member side flanges and pivot members mounted on the deal drawer rearwardly aligned with the front end member pivot recesses; wherein the deal drawer pivot members are engaged in the front end member pivot recesses with the front end member side flanges extending rearwardly along the deal drawer receptacle during the edgewise downward and upward bodily movement of the front end member front wall relative to the receptacle front; wherein the deal drawer pivot members move rearwardly out of the front end member pivot recesses releasing the pivotal connection between the front end member and deal drawer and positioning the front end member front wall at the window wall opening when the deal drawer receptacle is moved rearwardly through and rearwardly from the wall opening, and re-engaging for pivotal connection upon movement of the deal drawer receptacle forwardly to the wall opening; wherein the means for moving the deal drawer moves the deal drawer rearwardly to a position with the receptacle spaced rearwardly from the front end member front wall and forwardly into a position with the receptacle rearwardly adjacent the front end member front wall; and wherein the means operably connected to the front end member controlling the pivotal edgewise downward and upward bodily movement of the front end member front wall includes a generally L-shaped slot formed in at least one of the front end member side flanges having a normally generally horizontally extending slot portion and a normally generally vertically extending slot portion, a control member mounted on the deal drawer movably engaged in the L-shaped slot of the front end member side flange movable in the horizontal slot portion during movement of the deal drawer forwardly and rearwardly at the front end member while the deal drawer is inward of the window wall opening and movable in the vertical slot portion during engagement of the deal drawer pivot members in the front end member pivot recesses for the downward and upward edgewise bodily movement of the front end member front wall while the deal drawer is moving outwardly through and rearwardly through the wall opening, cam roller means mounted on the stationary frame inward of the wall opening movably engaged with cam means formed on the front end member, the cam means moving outwardly and inwardly along the cam roller means during movement of the deal drawer and front end member outwardly and inwardly through the wall opening, and the cam means having cam surface means for controlling the pivotal edgewise downward bodily movement of the front end member front wall during movement of the deal drawer and front end member outwardly through the wall opening and for moving the front end member front wall pivotally edgewise bodily upward to said aligned position during movement of the deal drawer and front end member inwardly through the wall opening.

12. In deal drawer construction for use with bank drive-up windows of the type in which a window wall having inner and outer sides is formed with a drawer opening, in which a deal drawer is mounted on a stationary frame movable through the wall opening between the inner and outer sides of the wall, and in which there is means operably connected to the deal drawer for selectively moving the drawer through the wall opening between an inner position accessible to a teller and an outer position accessible to a customer; the improvements including, a receptacle formed in the deal drawer and opening at least partially upwardly and having at least a partially open front providing upper and front access to the receptacle, a front end member having a front wall with upper and lower edges, pivot means spaced rearwardly from the front end member front wall and the receptacle open front operably connecting the front end member to the deal drawer for movement of at least the front end member front wall between an upper position with the front wall generally forwardly aligned with and closing the receptacle front at least when the deal drawer is inward of the window wall and a lower position with the front wall pivoted edgewise bodily downwardly simultaneously moving both the upper and lower edges of the front wall downwardly and substantially exposing the receptable front when the deal drawer is moved outwardly through the window wall opening, means operably connected to the front end member for at least controlling the pivotal edgewise downward bodily movement of the front end member front wall during movement of the deal drawer outwardly through the window wall opening and for moving the front end member front wall pivotally edgewise bodily upwardly from said lower position to said upper aligned position during movement of the deal drawer rearwardly through the window wall opening, a receptacle cover, means pivotally mounting the receptacle cover over the receptacle at least during movement of the deal drawer outwardly and inwardly through the window wall opening for pivoting of the cover between a closed position extending generally horizontal and upwardly covering the receptacle and an open position angled upwardly at least partially upwardly opening the receptacle, and means operably connecting the front end member and receptacle cover for pivoting of the cover upwardly to open position during movement of the front end member front wall downwardly to lower position and at least controlling pivotal movement of the receptacle cover to closed position during movement of the front end member front wall upward to upper position.

13. Deal drawer construction as defined in claim 12 wherein the means operably connecting the front end member and receptacle cover for pivoting of the cover includes tab means formed on the front end member engageable with the receptacle cover for pivoting of the cover upwardly relative to the receptacle during the downward movement of the front end member front wall and at least controlling downward pivoting of the receptacle cover back to horizontal position during upward movement of the front end member front wall.

14. Deal drawer construction as defined in claim 12 wherein the front end member includes spaced upstanding side flanges connected to the front wall and extending rearwardly; wherein the pivot means operably connecting the front end member to the deal drawer is formed partially by the front end member side flanges with said side flanges extending rearwardly along the deal drawer receptacle for the edgewise downward and upward bodily movement of the front end member front wall relative to the receptacle front; wherein the pivot means operably connecting the front end member and deal drawer includes means for releasing the pivot means between the front end member and deal drawer positioning the front end member front wall at the window wall opening when the deal drawer receptacle is moved rearwardly through and rearwardly from the wall opening and for re-engaging the pivot means upon movement of the deal drawer receptable forwardly to the wall opening; wherein the means for moving the deal drawer moves the deal drawer rearwardly to a position with the receptable spaced rearwardly from the front end member front wall and forwardly to a position with the receptable rearwardly adjacent the front end member front wall; wherein there is means operably connected to the receptacle cover and front end member for separating the receptacle cover from the pivotal mounting on the deal drawer and retaining the receptacle cover with the front end member upon the release of the pivot means between the front end member and deal drawer during rearward movement of the deal drawer through and rearwardly from the window wall opening, and for re-establishing the pivotal mounting of the receptacle cover on the deal drawer over the receptable upon the re-engagement of the pivot means between the front end member and deal drawer upon movement of the deal drawer receptacle forwardly to the wall opening.

15. Deal drawer construction as defined in claim 12 wherein the front end member includes spaced upstanding side flanges connected to the front wall and extending rearwardly; wherein the pivot means operably connecting the front end member to the deal drawer includes rearwardly opening pivot recesses formed in the front end member side flanges and pivot members mounted on the deal drawer rearwardly aligned with the front end member pivot recesses; wherein the deal drawer pivot members are engaged in the front end member pivot recesses with the front end member side flanges extending rearwardly along the deal drawer receptacle during the edgewise downward and upward bodily movement of the front end member front wall relative to the receptacle front; wherein the deal drawer pivot members move rearwardly out of the front end member pivot recesses releasing the pivotal connection between the front end member and deal drawer and positioning the front end member front wall at the window wall opening when the deal drawer receptacle is moved rearwardly through and rearwardly from the wall opening, and re-engaging for pivotal connection upon movement of the deal drawer receptacle forwardly to the wall opening; wherein the means for moving the deal drawer moves the deal drawer rearwardly to a position with the receptacle spaced rearwardly from the front end member front wall and forwardly into a position with the receptacle rearwardly adjacent the front end member front wall; wherein the means operably connected to the front end member controlling the pivotal edgewise downward bodily movement of the front end member front wall includes a generally L-shaped slot formed in at least one of the front end member side flanges having a normally generally horizontally extending slot portion and a normally generally vertically extending slot portion, a control member mounted on the deal drawer movably engaged in the L-shaped slot of the front end member side flange movable in the horizontal slot portion during movement of the deal drawer forwardly and rearwardly of the front end member while the deal drawer is inward of the window wall opening and movable in the vertical slot portion during engagement of the deal drawer pivot members in the front end member pivot recesses for the downward and upward edgewise bodily movement of the front end member front wall while the deal drawer is moving outwardly through and rearwardly through the wall opening, cam roller means mounted on the stationary frame inward of the wall opening movably engaged with cam means formed on the front end member, the cam means moving outwardly and inwardly along the cam roller means during movement of the deal drawer and front end member outwardly and inwardly through the wall opening, and the cam means having cam surface means for controlling the pivotal edgewise downward bodily movement of the front end member front wall during movement of the deal drawer and front end member outwardly through the wall opening and for moving the front end member front wall pivotally edgewise bodily upward to said aligned position during movement of the deal drawer and front end member inwardly through the wall opening; wherein there is means operably connected to the receptacle cover and front end member for separating the receptacle cover from the pivotal mounting on the deal drawer and retaining the receptacle cover with the front end member upon the release of the deal drawer pivot members from the front end member upon the release of the deal drawer pivot members from the front end member pivot recesses when the deal drawer receptacle is moved rearwardly through and rearwardly from the window wall opening, and for re-establishing the pivotal mounting of the receptacle cover on the deal drawer over the receptacle upon the re-engagement of the deal drawer pivot members and the front end member pivot recesses upon movement of the deal drawer receptacle forwardly to the wall opening; and wherein tab means is formed on certain of the front end member side flanges engageable with the receptacle cover for pivoting of the cover upwardly relative to the receptacle during the downward movement of the front end member front wall and at least controlling downward pivoting of the receptacle cover back to horizontal position during upward movement of the front end member front wall.

(References on following page)

References Cited by the Examiner

UNITED STATES PATENTS

| | | | |
|---|---|---|---|
| 741,042 | 10/1903 | Kailor et al. | 74—242.1 |
| 2,600,986 | 6/1952 | Gallagher | 312—303 |
| 2,730,053 | 1/1956 | Ellithorpe | 232—44 |
| 2,897,683 | 8/1959 | Carver | 74—242.1 |
| 2,914,244 | 11/1959 | Wheeler | 232—44 |
| 3,028,074 | 4/1962 | Graber et al. | 232—44 |
| 3,033,637 | 5/1962 | Van Donk et al. | 312—303 |
| 3,059,840 | 10/1962 | Graber et al. | 109—19 X |
| 3,145,918 | 8/1964 | Higgins et al. | 232—44 X |

FOREIGN PATENTS 1,037,893   8/1958   Germany.

FRANK B. SHERRY, *Primary Examiner.*

R. B. FARLEY, *Assistant Examiner.*